United States Patent

Joyce et al.

[11] Patent Number: 5,708,055
[45] Date of Patent: Jan. 13, 1998

[54] THERMOPLASTIC COMPOSITION COMPRISING CHEMICALLY MODIFIED CARBON BLACK AND THEIR APPLICATIONS

[75] Inventors: George Alfred Joyce, Monroe; Edward Lester Little, West Monroe, both of La.

[73] Assignee: Columbian Chemicals Company, Atlanta, Ga.

[21] Appl. No.: 603,018

[22] Filed: Feb. 16, 1996

Related U.S. Application Data

[63] Continuation of Ser. No. 382,149, Feb. 1, 1995, abandoned.

[51] Int. Cl.$^6$ ........................................ C08K 9/00
[52] U.S. Cl. .................. 523/215; 524/252; 524/251; 524/254; 524/257; 524/260; 423/460; 427/249; 428/403
[58] Field of Search .................. 523/215; 524/260, 524/251, 252, 254, 257, 864; 423/460; 427/249; 428/403

[56] References Cited

U.S. PATENT DOCUMENTS

| | | | |
|---|---|---|---|
| 2,867,540 | 1/1959 | Harris | 523/215 |
| 3,697,476 | 10/1972 | Lagally | 523/215 |
| 4,486,562 | 12/1984 | Fischer et al. | 524/156 |
| 4,721,749 | 1/1988 | Takeshita et al. | 523/215 |
| 4,740,538 | 4/1988 | Sekutowski | 523/205 |
| 4,764,547 | 8/1988 | Hatanaka et al. | 523/215 |
| 4,849,251 | 7/1989 | Tanaka | 427/101 |
| 5,002,829 | 3/1991 | Shibahara | 428/409 |
| 5,200,164 | 4/1993 | Medalia et al. | 423/265 |
| 5,369,143 | 11/1994 | Kurimoto et al. | 523/215 |

FOREIGN PATENT DOCUMENTS

| | | | |
|---|---|---|---|
| 6116868 | 4/1994 | Japan | 523/215 |
| 0410032 | 1/1974 | U.S.S.R. | 523/215 |
| 1068445 | 1/1984 | U.S.S.R. | 523/215 |

*Primary Examiner*—Vasu Jagannathan
*Assistant Examiner*—Olga Asinovsky
*Attorney, Agent, or Firm*—Pravel, Hewitt, Kimball & Krieger

[57] ABSTRACT

What is disclosed is an improved thermoplastic composition for use in wire and cable manufacturing processes, which features the use of from about 15 to 45 percentage by weight of a modified furnace carbon black having a specific surface area of from about 35 to 250 m$^2$/g, preferably 35 to 60 m$^2$/g, as measured by the nitrogen adsorption surface area method. The modified carbon black is prepared by combining the carbon black with a specified amount of amine, under certain conditions, and heating the reactive mixture for an extended period.

11 Claims, 1 Drawing Sheet

THERMOPLASTIC COMPOSITION COMPRISING CHEMICALLY MODIFIED CARBON BLACK AND THEIR APPLICATIONS

This is a continuation of application Ser. No. 08/382,149 filed on Feb. 1, 1994 now abandoned.

SPECIFICATION

FIELD OF THE INVENTION

This invention relates to improved thermoplastic compositions for general use in wire and cable manufacturing processes.

BACKGROUND OF THE INVENTION

The use of thermoplastic elastomers, and particularly for example the use of polyethylene-vinyl acetate ("poly-EVA"), has become widespread in the wire and cable manufacturing industry due to a number of their attractive physical and chemical properties. Carbon black has been used extensively as a filler in poly-EVA systems to impart a variety of properties such as resistance to UV degradation, enhanced conductance or resistance, opacity, and reinforcement. Wire and cable manufacturing processes utilize thermoplastic elastomers which contain very clean and easily dispersible carbon blacks in shielding compounds.

Compounding of these shielding materials and subsequent extrusion of these materials to yield the final cable product exposes the thermoelastomer to appreciable quantities of heat. Thermal degradation of the polymer system resulting from this exposure is a serious problem; it can adversely affect the functional characteristics of a filled product, decreasing product performance and/or increasing production waste. Most conventional technologies employ a variety of stabilizers to combat thermal degradation. These stabilizers vary widely in their effectiveness and cost.

BRIEF SUMMARY OF THE INVENTION

The invention solves problems associated with thermal degradation in commercially important thermoplastic elastomers by employing specially modified carbon blacks.

Furnace carbon blacks are mixed with select amines. The carbon black—amine mixture is heated to a temperature at or about the boiling point of the amine for an extended period of time to effect reaction between the amine and the carbon black. The mixture is then cooled, extracted, and dried. The resulting carbon black exhibits a number of useful properties, and, when it is combined with thermoplastic elastomers, such as poly-EVA, a highly useful thermoplastic elastomeric composition results.

DETAILED DESCRIPTION OF THE PREFERRED EMBODIMENT

Figure 1:
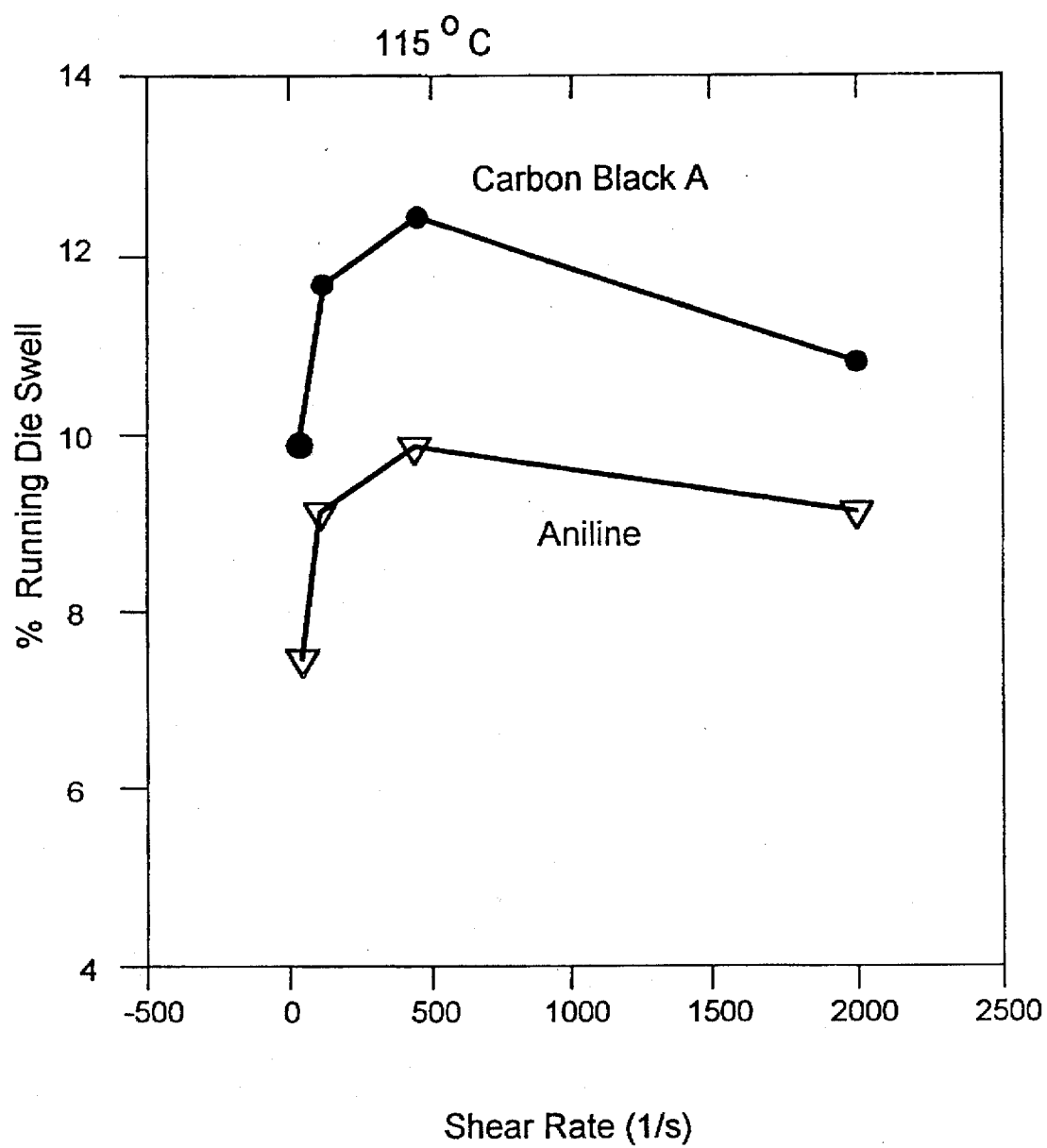
FIG. 1 is a graph which compares the die swell characteristic of (a) a poly-EVA composition which contains a carbon black labeled as Carbon Black A treated with aniline in accord with the invention (labeled "Aniline"), with (b) a poly-EVA composition which contains untreated Carbon Black A (labeled "Carbon Black A").

Disclosed herein is a process which yields a thermoplastic elastomeric composition which is particularly useful in wire and cable manufacturing processes.

To accomplish the objects of the invention, a specially modified carbon black is mixed with the thermoplastic elastomer by means which are well known to the art. It is believed that it is the specially modified carbon black which is responsible for imparting to the thermoplastic the desired properties discussed below.

The invention employs furnace carbon blacks having a surface area from about 35 to about 250 $m^2/g$, preferably from about 35 to about 60 $m^2/g$, as measured by the nitrogen adsorption surface area method of American Society of Testing Materials ("ASTM") Standard D4820. Typical furnace carbon blacks which may be so modified would include, for example, N550, N630, N650, and N660. Additional carbon blacks would include, but would not be limited to, the Columbian Chemicals' carbon blacks CDX-975 and CDX-SC. Carbon Black A, a furnace carbon black having a surface area of about 38 to about 48 $m^2/g$, unless otherwise indicated, is the carbon black utilized in the examples provided herein.

In the preferred embodiment, a quantity of a conductive carbon black having a surface area of about 35 to about 250 $m^2/g$, such as Carbon Black A, is first dried so that it has a moisture content of less than 0.001 pounds moisture per pound dry carbon black. The drying is accomplished by forced air heating at about 110° C.

The dried carbon black is then mixed with an amine. In many cases, intimate mixing of the carbon black and the amine is accomplished by mixing the carbon black with a solution comprising an amine and an inert distributing solvent.

The amine is selected from the group consisting of aliphatic amines having from four to ten carbon atoms, or substituted arylamines where the substituents represent —SH, —Cl, —$NH_2$, —$C_nH_{2n+2}$ where n can range from 1–6, —COOH, —$COOC_nH_{2n}$ where n can range from 1–6, etc. and monoarylamines. Monoarylamines include those aromatic compounds having the functional group—$(CH_2)_nNH_2$ attached to the aromatic ring (n=0 to about 10, preferably 0 to about 5, most preferably 0 or 1). The amine is to be present in an amount from about 0.1% to about 10.0% by weight of carbon black, in most cases preferably from about 0.1% to about 3.0% by weight of carbon black. If employed, the inert distributing solvent chosen should preferably be able to solvate the chosen amine, feature as low a boiling point as possible (i.e., as far below that of the amine as possible), and not interact appreciably with the carbon black surface. One amine—solvent system which has been found to be particularly effective is aniline, used in conjunction with acetone as the distributing solvent.

As stated, the amine—distributing solvent solution is thoroughly mixed with the dried carbon black, providing intimate contact between the amine and the carbon black. In the alternative, one may use a heated, vaporized form of the reagent in a mixer, such as a pin machine, to provide the necessary contact between the reagent and the carbon black.

If a distributing solvent is employed, it is then removed. In the case of amine—acetone systems, this may be accomplished by evaporation at near—ambient conditions. The distributing solvent must be substantially removed from the carbon black, so that it represents no more than about 0.001 pounds solvent per pound dry carbon black.

Next, the carbon black—amine mixture is heated to a temperature at or about the boiling point of the amine for a time sufficient to effect reaction between the amine and the carbon black. In the case of the amines disclosed herein, this may be accomplished by heating the mixture to about 20° C.

over the boiling point of the amine for a period from about 0.1 to about 6.0 hours. In the case of aniline, the mixture is heated by means of a heated laboratory reactor to a temperature from about 150° C. to about 200° C., preferably about 175° C., for a time of about 4 hours, at which time complete reaction is achieved.

The heated carbon black—amine mixture is then allowed to cool.

The cooled mixture is extracted with a solvent such as acetone to remove residual amine. Finally, the solvent washed modified carbon black is dried using a forced air oven at about 110° C. until dried. The dried modified carbon black may then be combined with, for example, poly-EVA according to any of the means well known to the art in order to derive the benefits of the invention.

As stated above, the select amines, or substituted arylamines where the substituents represent —SH, —Cl, —$NH_2$, —$C_nH_{2n+2}$ where n can range from 1–6, —COOH, —$COOC_nH_{2n}$ where n can range from 1–6, etc. or monoarylamines are present in an amount of from about 0.1% to about 10.0% by weight carbon black, in most cases preferably from about 0.1% to about 3.0% by weight carbon black. The surface reactivity of the carbon black was determined by a continuous thermometric titration using an isoperibol solution calorimeter. A preferred titration is an acid-base reaction between the carbon black and a titrant which will react with the acidic sites at the surface of the black. A preferred titrant is 0.124N butylamine in a cyclohexane solvent.

The preferred procedure is to dry a representative sample of approximately 0.1 to 0.5 grams of the carbon black to be modified for one hour at 110° C. in a forced air oven. The sample is weighed and placed into the titration reaction vessel. The butylamine titrant, which utilizes cyclohexane as the diluting solvent, is prepared and attached to the calorimeter.

The calorimetric procedure which follows will vary depending upon the equipment employed. However, in general, isoperibol solution calorimetry is a technique in which the temperature of a reaction vessel (here containing the carbon black suspended in cyclohexane) in a constant temperature environment is carefully measured as a function of time. Typical calorimeters used in the art feature carefully designed reaction vessels, a rapidly responding thermistor as the temperature measuring device, and a carefully designed heater to control the temperature. All of the major system components are designed to quickly reach temperature equilibrium to facilitate the delicate calibrations and measurements required. Although there are several such calorimeters available in the marketplace, the inventors have used, in generating the disclosures contained herein, the Hart Scientific isoperibol solution calorimeter, Model 4825.

In the continuous titration disclosed herein, the butylamine—cyclohexane titrant is continuously added, so that a plot of the temperature versus the volume of titrant added may be analyzed. In general, the plot will feature an initial region of low slope, during which the main heat effects are the minor ones associated with heat loss prior to titrant addition. Once the titration is initiated, there will be a significant increase in the slope of the plot resulting from the heat of reaction. At a certain point in time thereafter, the slope of the plot will significantly plateau despite the continuous and ongoing addition of titrant; it is at this point that the reaction has run to completion or equilibrium. The volume added at this point in time is the stoichiometric amount of amine which will react with the carbon black.

The thermoplastics of interest in this invention are those which undergo elimination-type degradation. These systems typically degrade due to abstraction of hydrogen from a carbon adjacent to the carbon onto which the functional group which is prone to elimination is attached.

The different thermoplastics which therefore would be of greatest interest in the practice of the invention would include those thermoplastic systems classified as copolymers derived from an alpha-olefin and an ethylenically unsaturated carboxylic acid or ester. This would include thermoplastic acetates and acrylates such as, but not limited to, poly(vinyl acetates); poly(ethylene-vinyl acetates) (also known as "poly-EVA"); poly(ethylene-ethyl acrylates) (also known as "poly-EEA"); poly(ethylene-butyl acrylates); poly (ethylene-methyl acrylates); and poly(propylene-ethyl acrylates). The invention is also expected to be effective with any thermoplastic which undergoes elimination during thermal degradation. This would include, again by way of example only, halogenated thermoplastics such as poly (vinyl chloride), a poly(vinyl halide).

The inventors believe that thermal degradation of the polymer systems of interest typically occurs in extrusion processes when the thermoplastic is exposed to "hot spots" within the extrusion system or when a portion of the thermoplastic is prone to a longer residence time within the extrusion system (e.g., at stagnant zones or other low flow areas). Without limiting themselves to a particular theory, the inventors estimate that there may be at least three different possible mechanisms by which the chemically modified carbon black of the invention can reduce the occurrence of thermal degradation: (a) reduction of active sites on the carbon black which promote thermal degradation; (b) inhibition of the degradation mechanism by reaction of chemical species on the carbon black surface with degradation intermediates; and (c) reduction in the rate of degradation due to interaction of chemical species on the carbon black surface with polymer reaction sites.

In the examples which follow, the compounding was performed using a Brabender mini-mixer or a BR Banbury; however, other mixers would doubtless perform equally well. It is recommended that the carbon black be present in a proportion from about 15% to about 45% by weight polymer, or about 18 to about 82 parts per hundred parts by weight of polymer.

EXAMPLE 1

About 600 grams of Carbon Black A was dried by means of a forced air oven at 110° C. A quantity of various reagents, including aniline, methanol, hexanol, decanol, and phenol, representing 5% by weight of the carbon black, or about 30 grams, were individually utilized in turn in the following regimen.

The reagent was dissolved in 700 ml of acetone, and the reagent—acetone mixture was thoroughly stirred to yield as homogeneous a solution as possible.

The reagent—acetone solution was then combined with the dried carbon black, and the resulting mixture thoroughly blended. The 700 ml volume of the distributing solvent, acetone, was selected to ensure that, upon mixing with the carbon black, the reagent would be intimately and thoroughly distributed throughout the carbon black. The acetone was then allowed to evaporate in a laboratory hood.

The carbon black-reagent mixture remaining was then placed in a laboratory reactor at about 20° C. above the boiling point of the reagent, and it was maintained in this condition for about 3 to 4 hours. The carbon black was then acetone washed and dried.

The dried modified carbon blacks were then combined with virgin poly-EVA using a Brabender mini-mixer. The carbon black was combined with Quantum Chemicals' Ultrathene UE-634 (28% vinyl acetate), so that the carbon black represented about 38% by weight of the total composition. The carbon black—poly-EVA system was mixed for 5 minutes, cooled, and then granulated.

The poly-EVA compounds containing the reagent-modified carbon blacks were subjected to a heat aging process to test the properties of the system. The heat aging consisted of subjecting the system to a temperature of about 200° C. in a forced air oven for a period of about 16 hours.

Extruded tape was prepared in a ¾-inch lab extruder using a 1-inch tape die. The die temperature was about 182° C. The visual appearance of the heat-aged compounds is summarized in the table below:

TABLE 1

| System | Visual Appearance of Heat - Aged Compound Upon Extrusion |
|---|---|
| Carbon Black A/EVA Control | Rough |
| Carbon Black A/EVA Aniline-Treated | Very Shiny |
| Carbon Black A/EVA Methanol-Treated | Smooth |
| Carbon Black A/EVA Hexanol-Treated | Smooth |
| Carbon Black A/EVA Decanol-Treated | Smooth |
| Carbon Black A/EVA Phenol-Treated | Rough |

These visual observations suggest the influence of the modified carbon blacks on the aesthetic characteristics of heat-aged compound extrudates. The tape surface of compound containing the control carbon black (unmodified) was dull in appearance with a large number of surface flaws thus giving the tape a rough texture. Tapes prepared with compounds containing alcohol-treated blacks were more smooth in appearance with less flaws than the control. The aniline-treated black yielded tapes which were shiny and smoother than any other tapes in this comparison; their average surface roughness was the lowest of all.

To confirm the necessity of the treatment conditions recommended herein, another sample of Carbon Black A was treated with aniline at about room temperature (at or about 23° C.) in a Henschel mixer; the sample so treated demonstrated no improvement upon extrusion.

The treated carbon blacks also exhibited lower moisture adsorption than untreated control. This is evidenced by the following table:

TABLE 2

| System | % Moisture Adsorption (@ 1 hr) |
|---|---|
| Carbon Black A Control | 0.12 |
| Carbon Black A Aniline-Treated | 0.03 |
| Carbon Black A Methanol-Treated | 0.10 |
| Carbon Black A Hexanol-Treated | 0.07 |
| Carbon Black A Decanol-Treated | 0.10 |
| Carbon Black A Phenol-Treated | no data |

The aniline treated carbon black adsorbed 0.03% moisture in one hour versus 0.12% for the untreated carbon black at 22° C. and 72% relative humidity; thus, the treatment resulted in a 75% reduction in moisture adsorption. The alcohol-treated blacks also exhibited a reduction in moisture absorption, but to a lesser extent than the aniline-treated black. This reduction in moisture adsorption is important, because it demonstrates the extent to which the active sites on the carbon black at which thermal degradation could occur (and at which moisture adsorption occurs as well) have been occupied by the amine.

Another significant effect of the aniline-treated carbon blacks is the change in rheology of the thermoplastic compounds after enduring the heat aging described above, as evidenced by the following table:

TABLE 3

| System | Melt Flow (g/10 min) ASTM D1238 |
|---|---|
| Carbon Black A/EVA Control | 2.1 |
| Carbon Black A/EVA Aniline-Treated | 57.5 |
| Carbon Black A/EVA Methanol-Treated | 6.4 |
| Carbon Black A/EVA Hexanol-Treated | no data |
| Carbon Black A/EVA Decanol-Treated | no data |
| Carbon Black A/EVA Phenol-Treated | no data |

Thus, after heat aging, the aniline-treated carbon black EVA composite had a melt flow of 57.5 g/10 min, approximately 25 times greater than the 2.1 g/10 min observed for untreated carbon black. The same trend in rheology was observed for another furnace carbon black having a slightly higher surface area.

The aniline-treated carbon black also imparts an improved dimensional stability to the thermoplastic compound. The die swell (i.e., the ratio of the area of the cross-section of the extrudate to that of the die) of the poly-EVA compound having the aniline-treated carbon black is observed to be much lower than that of the poly-EVA compounds using the untreated carbon black. This is graphically depicted in FIG. 1.

EXAMPLE 2

About 600 grams of Carbon Black A was dried by means of a forced air oven at 110° C. A quantity of various reagents, including aniline, benzylamine, butylamine, hexylamine, and decylamine, representing 5% by weight of the carbon black, or about 30 grams, were individually utilized in turn in the following regimen.

The reagent was dissolved in 700 ml of acetone, and the reagent—acetone mixture was thoroughly stirred to yield as homogeneous a solution as possible.

The reagent—acetone solution was then combined with the dried carbon black and the resulting mixture thoroughly blended. The 700 ml volume of the distributing solvent, acetone, was selected to ensure that, upon mixing with the carbon black, the reagent would be intimately and thoroughly distributed throughout the carbon black. The acetone was allowed to evaporate in a laboratory hood.

The carbon black-reagent mixture remaining was then placed in a laboratory reactor at about 20° C. above the boiling point of the reagent, and it was maintained in this condition for about 3 to 4 hours. The carbon black was then acetone washed and dried.

The dried modified carbon blacks were then combined with poly-EVA using a BR Banbury. The carbon black was combined with Quantum Chemicals' Ultrathene UE-634 (28% vinyl acetate), so that the carbon black represented about 38% by weight. The carbon black—poly-EVA system was mixed for 4 minutes.

The composition was then subjected to a heat aging process to test the properties of the system. The heat aging consisted of subjecting the system to a temperature of about 200° C. in a forced-air oven for a period of about 16 hours.

Extruded tape was prepared in a ¾-inch lab extruder using a 1-inch tape die. The die temperature was about 182° C.

Tapes were made using the original compounds, heat-aged compounds, and blends of both (e.g., 1%; 25% heat-aged). Two blends were prepared to observe the effects of increasing the concentration of heat-aged compound. It is believed that a 1% concentration of heat-aged compound blended into the original compound may be representative of contamination of thermally degraded compounds; in such a case, the contaminants, ordinarily entrapped within the system, can then become released into the product forming defects at extrusion surfaces.

The number of imperfections of 0.1 to 0.5 millimeters in size occurring on a 2.2 centimeter by 50 centimeter area (1.0% heat aged blend) was observed and is summarized in the table below:

TABLE 4

| System | Number of Imperfections 1% heat aged blend |
| --- | --- |
| Carbon Black A Control/EVA | 1520 |
| Carbon Black A Aniline/EVA | 130 |
| Carbon Black A Benzylamine/EVA | 135 |
| Carbon Black A Butylamine/EVA | 240 |
| Carbon Black A Hexylamine/EVA | 220 |
| Carbon Black A Decylamine/EVA | 145 |

The table demonstrates that the amine-treated samples demonstrated improvements over the control.

The treated carbon blacks also exhibited a significantly lower moisture adsorption than untreated control. This is evidenced by the following table:

TABLE 5

| System | % Moisture Adsorption (@ 1 hr) |
| --- | --- |
| Carbon Black A/EVA Control | 0.13 |
| Carbon Black A/EVA Aniline | 0.03 |
| Carbon Black A/EVA Benzylamine | 0.10 |
| Carbon Black A/EVA Butylamine | 0.12 |
| Carbon Black A/EVA Hexylamine | 0.10 |
| Carbon Black A/EVA Decylamine | 0.07 |

The aniline-treated carbon black adsorbed 0.03% moisture in one hour versus 0.13% for the untreated carbon black at 22° C. and 72% relative humidity; thus, the treatment resulted in a 75% reduction in moisture adsorption. The other amine-treated blacks exhibited reduced moisture absorption, but to a lesser extent than the aniline-treated black.

Another significant effect of the amine-treated carbon blacks is the change in rheology of the resulting thermoplastic compositions after enduring the heat aging described above, as evidenced by the following table:

TABLE 6

| System | Melt Flow (g/10 min) ASTM D1238 190/21.6 kg |
| --- | --- |
| Carbon Black A/EVA Control | 2.1 |
| Carbon Black A/EVA Aniline | 57.5 |
| Carbon Black A/EVA Benzylamine | 91.5 |
| Carbon Black A/EVA Butylamine | 51.0 |
| Carbon Black A/EVA Hexylamine | 78.1 |
| Carbon Black A/EVA Decylamine | 67.0 |

Thus, after heat aging, all of the amine-treated carbon blacks had a dramatically higher melt flow, much greater than the 2.1 g/10 min observed for untreated carbon black.

EXAMPLE 3

About 600 grams of Carbon Black A was dried by means of a forced air oven at 110° C. A quantity of various reagents, including aniline and aminothiophenol, representing 5% by weight of the carbon black, or about 30 grams, were individually utilized in turn in the following regimen.

The reagent was dissolved in 700 ml of acetone, and the reagent-acetone mixture was thoroughly stirred to yield as homogeneous a solution as possible.

The reagent-acetone solution was then combined with the dried carbon black and the resulting mixture thoroughly blended. The 700 ml volume of the distributing solvent, acetone, was selected to ensure that, upon mixing with the carbon black, the reagent would be intimately and thoroughly distributed throughout the carbon black. The acetone was allowed to evaporate in a laboratory hood.

The carbon black-reagent mixture remaining was then placed in a laboratory reactor at about 20° C. above the boiling point of the reagent, and it was maintained in this condition for about 3 to 4 hours. The carbon black was then acetone washed and dried.

The dried modified carbon blacks were then combined with either poly-EVA or poly (ethylene ethyl acrylate) ("poly-EEA") using a BR Banbury. In the case of the poly-EVA, the carbon black was combined with Quantum Chemicals' Ultrathene UE-634 (28% vinyl acetate), so that the carbon black represented about 38% of the total composition by weight. In the case of the poly-EEA, the carbon black was combined with Union Carbide DPD-6169 and also represented about 38% of the total composition by weight. The carbon black-polymer systems were mixed for 4 minutes.

The poly-EVA and poly-EEA compositions containing the reagent-modified carbon blacks were subjected to a heat aging process to test the properties of the system. The heat aging consisted of subjecting the system to a temperature of about 200° C. in a forced-air oven for a period of about 16 hours.

Extruded tape was prepared in a ¾-inch lab extruder using a 1-inch tape die. The die temperature was about 182° C.

The number of imperfections of 0.1 to 0.5 millimeters in size occurring on a 2.2 centimeter by 50 centimeter area (1.0% heat aged blend) was observed and is summarized in the table below:

TABLE 7

| System | Number of Imperfections |
| --- | --- |
| Carbon Black A/EVA Control | 1520 |
| Carbon Black A/EVA Aniline | 130 |
| Carbon Black A/EVA Aminothiophenol | 320 |
| Carbon Black A/EEA Control | >2000 |
| Carbon Black A/EEA Aniline | >2000 |
| Carbon Black A/EEA Aminothiophenol | 840 |

The table demonstrates that the aniline treatment was very effective in the poly-EVA system, but not as effective in the poly-EEA system; however, the aminothiophenol treatment was quite effective in both the poly-EVA and the poly-EEA systems.

* * *

The extrusion characteristics, melt flow, and die swell characteristics of the polymer systems using the modified carbon black suggest the great utility this system has for wire and cable manufacturing processes.

Although the best mode for practicing this invention has been disclosed, it is to be understood that the invention is not limited thereto. For a fuller understanding of the scope of the invention, reference should be made to the following claims.

What is claimed is:

1. An improved thermoplastic composition with improved resistance to elimination-type thermodegradation and thus, improved surface smoothness, resulting from a mixture comprising:
   (a) about 100 parts by weight of at least one thermoplastic selected from the group consisting of poly (ethylene-vinyl acetate); poly (ethylene-ethyl acrylate); poly (ethylene-butyl acrylate); poly (ethylene-methyl acrylate); poly (propylene-ethyl acrylate); and poly (vinyl chloride); and
   (b) from about 18 to about 82 pph polymer of a heated reaction product of a furnace carbon black and an amine wherein
      (1) the carbon black has a specific surface area from about 35 to about 60 $m^2/g$, ASTM D4820, and
      (2) the amine is selected from the group consisting of (a) aliphatic amines selected from the group consisting of butylamine, hexylamine, and decylamine, and (b) aromatic compounds having (1) the functional group —$(CH_2)_n NH_2$ attached to the aromatic ring (n is equal to 0 to about 10, or (2) both the functional group —$NH_2$ and one or more of the following attached to the aromatic ring: —SH, —Cl, —$NH_2$, or —COOH, and wherein said amine constitutes from about 0.1% to about 10.0% by weight of carbon black of the reaction product and further wherein said heated reaction product of carbon black and amine having been heated to a temperature of about 20° C. over the boiling point of the amine for a period of about 0.1 to 6.0 hours.

2. The composition of claim 1 wherein said heated reaction product of carbon black and amine having been heated for a period of about 4 hour.

3. The composition of claim 1, wherein said heated reaction product of carbon black and amine having been heated to a temperature of about 150° C. to about 200° C.

4. The composition of claim 1, wherein said heated reaction product of carbon black and amine having been heated to a temperature of about 175° C.

5. The composition of claim 1, wherein the amine is benzylamine.

6. The composition of claim 1, wherein the amine is an aliphatic amine selected from the group consisting of butylamine, hexylamine and decylamine.

7. A process for reducing elimination-type thermodegradation of a thermoplastic, and thus for reducing the surface roughness of an extruded thermoplastic, wherein the thermoplastic is selected from the group consisting of poly (ethylene-vinyl acetate); poly (ethylene-ethyl acrylate); poly (ethylene-butyl acrylate); poly (ethylene-methyl acrylate); poly (propylene-ethyl acrylate); and poly (vinyl chloride), and, said process comprising incorporating into the virgin thermoplastic, prior to extrusion, between from about 18 to about 82 pph polymer of a heat-treated reaction product of a furnace carbon black and an amine wherein
   (1) the carbon black has a specific surface area of from about 35 to about 60 $m^2/g$, ASTM D4820, and wherein
   (2) the amine is selected from the group consisting of (a) aliphatic amines selected from the group consisting of butylamine, hexylamine, and decylamine, and (b) aromatic compounds having (1) the functional group —$(CH_2)_n NH_2$ attached to the aromatic ring (n is equal to 0 to about 10, or (2) both the functional group —$NH_2$ and one or more of the following attached to the aromatic ring: —SH, —Cl, —$NH_2$, or —COOH, and wherein said amine constitutes from about 0.1% to about 10.0% by weight of carbon black of the reaction product, and further wherein the reaction product of furnace carbon black and amine is prepared by mixing into carbon black with the amine and heating the mixture to about the boiling point of the amine for a time sufficient to effect reaction between the amine and the carbon black.

8. The process of claim 7, wherein the mixture is heated to about 20° C. over the boiling point of the amine for about 4 hours.

9. The process of claim 7, wherein the amine is aniline.

10. The process of claim 7, wherein the amine is aminothiophenol.

11. The process of claim 7, wherein the amount of the amine to be added is the reaction equilibrium amount determined by thermometric titration.

* * * * *